United States Patent [19]

Van Steenbrugge et al.

[11] Patent Number: 4,903,015

[45] Date of Patent: Feb. 20, 1990

[54] COMMUNICATION DEVICE AND STAR CIRCUIT FOR USE IN SUCH A COMMUNICATION DEVICE, AND DEVICE COMPRISING SUCH A STAR CIRCUIT

[75] Inventors: Bernard Van Steenbrugge; Egbertus J. Berkhoff, both of Eindhoven, Netherlands

[73] Assignee: U.S. Philips Corporation, New York, N.Y.

[21] Appl. No.: 191,296

[22] Filed: May 6, 1988

[30] Foreign Application Priority Data

May 22, 1987 [NL] Netherlands .......................... 8701221

[51] Int. Cl.[4] ............................................ H04L 11/16
[52] U.S. Cl. .............................. 340/825.500; 370/85.7; 307/115; 307/112
[58] Field of Search .................. 340/825.5, 825.05; 370/85, 95; 455/9, 54; 307/38, 39, 112, 115, 98, 99

[56] References Cited

U.S. PATENT DOCUMENTS

| | | |
|---|---|---|
| 3,337,992 | 8/1967 | Tolson . |
| 4,531,238 | 7/1985 | Rawson et al. .................... 455/601 |
| 4,701,630 | 10/1987 | Annunziata et al. ............. 340/825.5 |
| 4,716,408 | 12/1987 | O'Conner et al. ............... 340/825.5 |
| 4,775,864 | 10/1988 | Herman ............................ 340/825.5 |

FOREIGN PATENT DOCUMENTS 0236339 11/1985 Japan ................................ 340/825.5

Primary Examiner—Donald J. Yusko
Assistant Examiner—E. O. Pudpud
Attorney, Agent, or Firm—Thomas A. Briody; Jack E. Haken; Anne E. Barschall

[57] ABSTRACT

In a communication device with a star circuit all electrical bus connections are terminated by their characteristic impedance at the side of the stations as well as at the side of a star circuit. In order to enable arbitrary connection/disconnection of stations without modification of the terminating impedances while at the same time the termination remains optimum, each bus connection is provided with a separating element. This element receives an active bus connection state and communicates this state to all other connections so that the local bus connections are also activated. However, when a bus applied to the relevant separating element so that the latter cannot signal a further activation. Furthermore, for each connection there is provided a logic circuit in order to prevent the signalling of the own activation back to the own bus connection, while the inhibit signal for the own bus connection need not be active either.

10 Claims, 2 Drawing Sheets

४,९०३,०१५

COMMUNICATION DEVICE AND STAR CIRCUIT FOR USE IN SUCH A COMMUNICATION DEVICE, AND DEVICE COMPRISING SUCH A STAR CIRCUIT

BACKGROUND OF THE INVENTION

The invention relates to a communication device, comprising a star circuit whereto a variable number of electrical bus connections with stations coupled thereto can be connected in order to form, by way of the assembly of bus connections, a bus organization for digital communication signals between the assembly of stations.

Generally, electrical bus connections should be electrically terminated at both ends by means of a characteristic impedance. When a number of stations are connected to an electrical bus connection and each of these stations possesses two connections for the electrical bus connection, these stations can be included in the communication device by the so-called looping through of the connections in the stations. In that case, the stations at the ends of the electrical bus connection in principle have a free connection where the electrical bus connection should be terminated. When a number of stations with a star circuit are connected to electrical bus connections, looping through does not take place and each station should be electrically terminated at the free connection, that is to say by means on a characteristic impedance which is dependent of the entire communication device with the connected stations. In order to avoid this system-dependent termination, each bus connection should be electrically terminated at the input of the station connected thereto. The communication device with the star circuit then comprises as many parallel terminating impedances as there are stations connected to the communication device. The impedance configuration is then again dependent on the number of stations, so that the operation of the communication device may be affected.

SUMMARY OF THE INVENTION

Therefore, it is the object of the invention to provide a communication device of the kind set forth in which said termination problems are mitigated. To achieve this, the communication device in accordance with the invention is characterized in that for each electrical bus connection to be connected the star circuit comprises an own connection network with a buffer element and a logic circuit, a communication signal which originates from a first station and which is supplied via a relevant bus connection being stored in the associated buffer element, a buffer output signal derived from said communication signal being applied to the logic circuit of all connection networks forming part of the star circuit, the output signal of each of these logic circuits, with the exception of that of the connection network whereto the communication signal originating from the first station has been applied, being applied, via a relevant bus connection, to a station connected thereto, each of the electrical bus connections between a relevant station and the star circuit being electrically terminated at both ends. The use of a star circuit for bus connections is known per se, i.e. a bus system with optical fibre connections as disclosed in U.S. Pat. No. 4,531,238. The star circuit in the cited Patent Specification serves to detect situations where a plurality of stations simultaneously transmit signals via the bus connections and to replace these signals in such situations by a specific collision signal which is to applied to all stations. This star circuit, however, is not intended for electrical bus connections.

In order to reduce the number of wires in the electrical bus connections, a preferred embodiment of the communication device in accordance with the invention is also characterized in that the electrical bus connection via which a communcation signal is transported from a station to the star circuit and that via which a communication signal is transported from the star circuit to the relevant station is the same, the output of each logic circuit being coupled to said electrical bus connection in a wired-logic configuration at the input of the relevant connection network, so that the bus connection carries a communication signal only if either a relevant station outputs a communication signal while no signal is output via the output of the relevant logic circuit, or if a signal is output via the output of the relevant logic circuit while no communication signal is output by the relevant station.

Even though the electrical bus connections via which signals are applied to the star circuit may differ from the electrical bus connections via which signals are applied from the star circuit to the stations, the use of the same electrical bus connections is to be preferred. These electrical bus connections may be formed by coaxial cables or, for example by twisted wire pairs; in the latter case, the difference signal of the two wires is applied to the relevant connection network and the signal supplied by this connection network is split into signal values which are suitable for the twisted wire pairs. The coupling of the output of a logic circuit to the relevant bus connection at the input of the connection network which is connected to this bus connection and which comprises said logic circuit, can be realized by way of a "wired-AND" connection as well as by way of a "wired-NOR" connection; the choice in this respect will be governed by the voltage level of the relevant signals and by the construction of the logic circuits in the connection networks. The invention also relates to a star circuit for use in such a communication device; it may be constructed, for example as a printed wiring board on which a number of TTL logic integrated circuits are mounted. The invention also relates to a device comprising a built-in star circuit and at least one station which is internally connected thereto via an associated bus connection, for example a television, and also relates to a device wherein said star circuit comprises at least one externally accessible connection for connection of an associated external station, for example a video recorder, via an external bus connection.

BRIEF DESCRIPTION OF THE FIGURES

The invention will be described in detail hereinafter with reference to the accompanying diagrammatic drawings; therein.

The embodiments to be described with reference to the Figures are by no means intended to restrict the scope of the invention; they merely serve to illustrate the invention.

DESCRIPTION OF A PREFERRED EMBODIMENT

Figure 1:
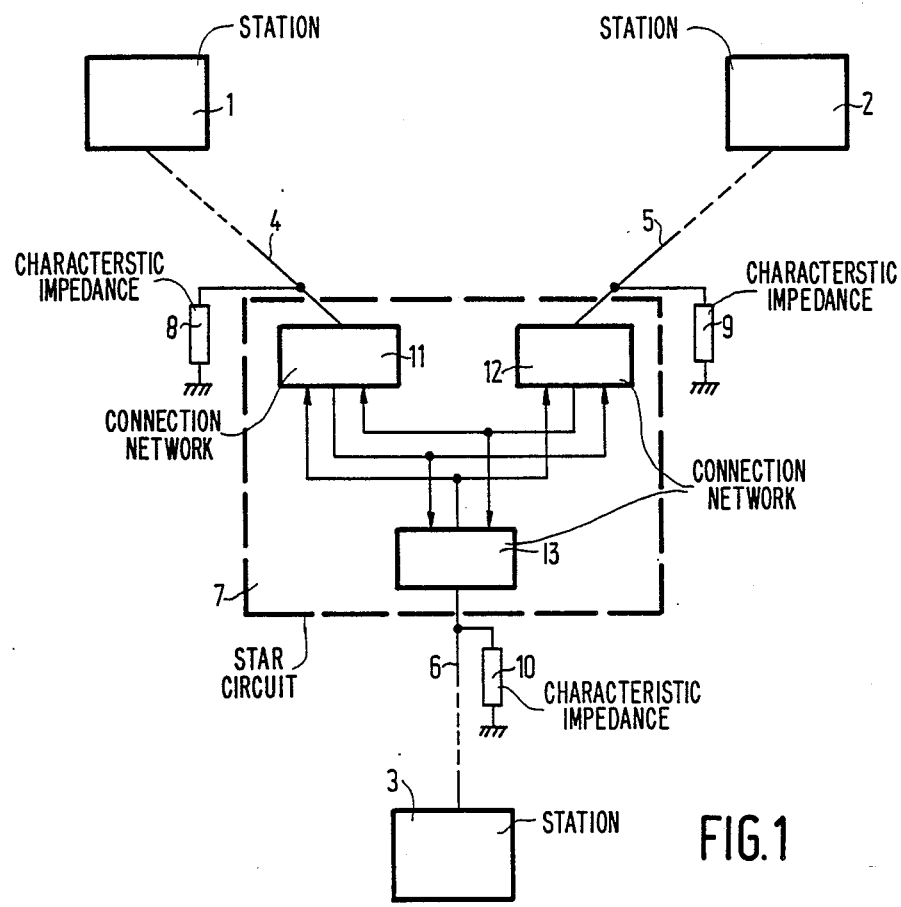
FIG. 1 shows a communication device with electrical bus connections in accordance with the invention, three stations being connected to said communication device.

FIG. 1 shows a communication device comprising electrical bus connections in a star configuration whereto three stations 1, 2 and 3 are connected. The communication device comprises electrical bus connections 4, 5 and 6 and a star circuit 7. The electrical bus connections 4, 5 and 6 are electrically terminated at the input of the star circuit 7 by means of a characteristic impedance 8, 9, 10, respectively. The star circuit may in principle be constructed for an arbitrary number of stations. A connection network is then provided for each station. Such a star circuit may be constructed as a printed wiring board on which there are mounted a number of integrated circuits, for example appropriate standard types (TTL and the like). Alternatively, each connection network is formed by a single integrated circuit in MSI technology. The entire star circuit can also be formed by a single integrated circuit. Generally, the termination resistors 8, 9 . . . will form a fixed part of the star circuit. This offers the advantage that disconnection/connection of a station can be realized by means of a connector and the like, without further facilities being required. Should any connection network not be connected to a station, the system will operate in the same manner. Usually star circuits comprising a fixed number of station connections will be manufactured, for example six connections. If a larger number of stations is connected, a second star circuit may be connected to one of the station connections. It has been found that the system then continues to operate in the same manner, albeit probably with a slightly lower operating frequency. A communication device of the present kind can be used, for example for exchanging control signals between consumer products such as TV receivers, CD players, tape recorders, microwave ovens, clocks, and installations for heating/light/air treatment.

In FIG. 1 the electrical bus connections are physically separated from one another, which means that an electrical current in a given bus connection in no way represents a load for a current source which is directly connected to any other bus connection, so that dynamic phenomena on the relevant bus connections which do not manifest themselves as a change of the logic state do not have an effect on the behaviour of another bus connection either. The electrical bus connections, however, are functionally coupled by the star circuit 7, which means that, subject to conditions to be described hereinafter, the voltage levels are taken over by the star circuit 7 from the electrical bus connections or vice versa by the electrical bus connections from the star circuit.

DESCRIPTION OF A CONNECTION NETWORK

Figure 2:
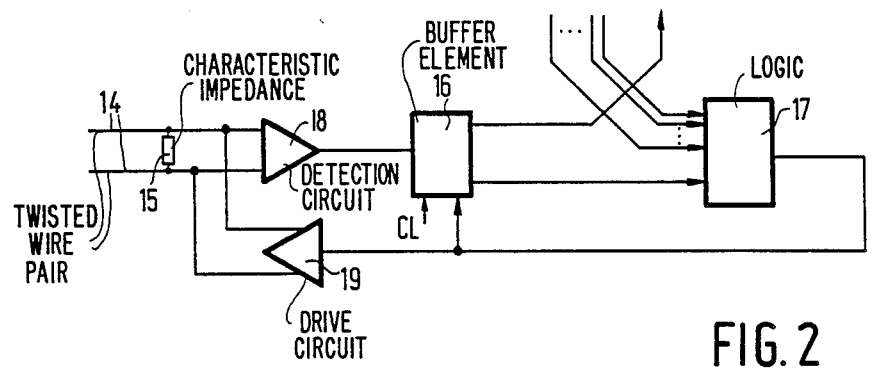
FIG. 2 shows an embodiment of a connection network for a star circuit.

For each connected electrical bus connection the star circuit 7 comprises a connection network 11, 12, 13, respectively. FIG. 2 shows a construction of such a connection network, that is to say for the case where the same electrical bus connection is used for the supply of signals to the star circuit and for the supply of signals from the star circuit to a connected station, and also for the case where the electrical bus connection is formed by a twisted wire pair 14 which is terminated, at the input of the connection network, by a characteristic impedance 15. The connection network comprises a buffer element 16 and a logic circuit 17. A signal applied via the twisted wired pair 14 is stored in the buffer element 16 after having been converted into a single-wire signal by means of a detection circuit 18. As will be described hereinafter, this storage will be dependent on the initial value of the logic circuit 17; storage takes place at instants determined by the clock pulses CL. A buffer output signal derived from this stored signal is applied to the logic circuits of all connection networks belonging to the star circuit. The output signal of the logic circuit 17 is converted, using a drive circuit 19, into voltage values which are suitable for the twisted wire pair 14. The coupling of the output of the logic circuit 17 to the twisted wire pair 14 is realized by means of a wired-AND logic function. In this respect it holds that, if the voltage value on an electrical bus connection is "1", no signal is present on this bus connection, while a signal to be applied via such a connection is characterized by the voltage value "0". Wired logic functions are known per se so that they need not be elaborated herein. If the bus connection is realized as a bidirectional single wire, the elements 18, 19 can be dispensed with. The input of the buffer element 16 and the output of the logic circuit 17 are then both connected to the relevant bus connection. The star point circuit and the associated connection networks, one of which is shown in FIG. 2, should satisfy the following requirements:

When no signal is applied to any of the connection networks, none of these connection networks may apply a signal to the connected stations.

When a signal is applied to any one of the connection networks, the relevant connection network may not output a corresponding signal; the other connection networks, however, should apply a corresponding signal to the stations connected thereto.

In the connection network whereto a signal is applied it should be stored that a signal originates from the station connected thereto and that this signal must be applied to the other stations.

Figure 3:
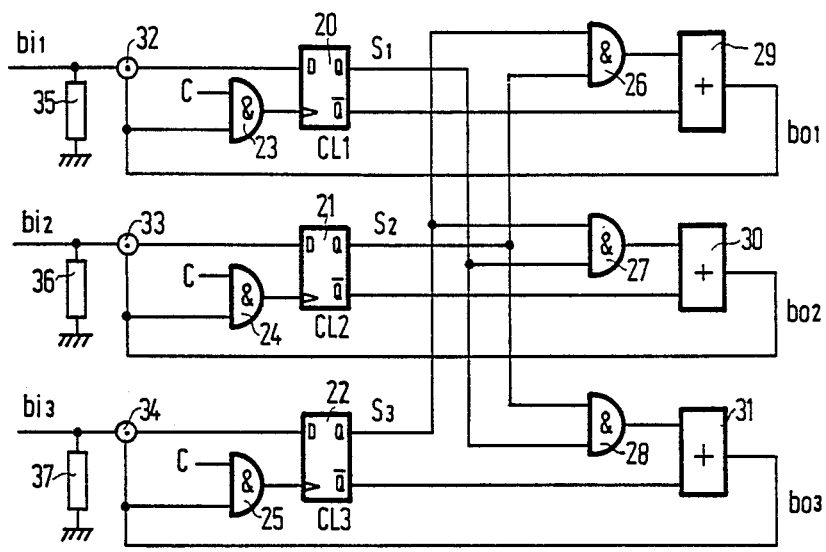
FIG. 3 shows an embodiment of the star circuit for a communication device whereto three stations can be connected.

A practical embodiment of a star circuit which comprises three connection networks and which satisfies these requirements is shown in FIG. 3. In this respect it is assumed that the electrical bus connections are formed by a single wire, for example a coaxial lead. The buffer elements are composed of a D-flipflop 20, 21 and 22, respectively, and an AND-gate 23, 24, 25, respectively. The logic circuits are composed of an AND-gate 26, 27, 28, respectively, and an OR-gate 29, 30, 31, respectively. The outputs of the OR-gates are combined in a wired-AND configuration which is coupled to the bus connections at the input of the relevant D-flipflops; these wired-AND couplings are diagrammatically denoted by 32, 33 and 34, respectively. The signals applied to the connection networks are denoted by bi1, bi2, and bi3, respectively; the signals output by the logic circuits are denoted by b01, b02 and b03, respectively, the clock pulses for the flipflops being denoted by CL1, CL2 and CL3. The terminating impedances of the bus connections at the side of the star circuit are denoted by 35, 36 and 37, respectively.

The operation of the circuit shown in FIG. 3 will be described with reference to the time diagrams shown in the FIGS. 4A and 4B. In the initial situation, $bi1=bi2=bi3=1$, $b01=b02=b03=1$, $S1=S2=S3=1$, so that $CL1=CL2=CL3=C$. When a signal $bi1=0$ is applied to the upper connection network while $bi2,3$ remain 1, the signal $bi1$ is written into the flipflop 20 in response to the positive-going edge of the next clock pulse, so that S1 becomes 0 while S2,3 remain 1. This situation is shown in the time diagrams of FIG. 4A. The AND-gates 27 and 28 are then blocked while the AND-gate 26 remains conductive, so that $b02,3$ become 0 and $b01$ remains 1. The signal (bi1) formed by the first station is thus applied to all other stations as $b02$, $b03$ by way of the wired AND-functions formed by the elements 32, 33, 34. This state changes only if the applied signal is interrupted again, so if bi1 becomes 1. This is because in response to the positive-going edge of the next clock pulse S1 become 1, the AND-gates 27 and 28 become conductive again and hence $b02,3$ become 1. Thus, the signal applied to the upper connection network is transferred to the bus connections connected to the other two connection networks and the initial situation has been restored. It is to be noted that during the period during which $b02,3=0$ the writing of the signal present on the bus connections into the flipflops 21 and 22 must be prevented; therefore, CL2, CL3 remain 0 during this period, which means that the write clock pulses for these flipflops are blocked.

Figure 4A:
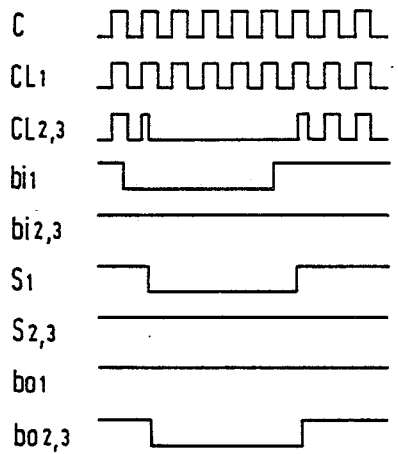
FIGS. 4A and 4B show two series of time diagrams illustrating the operation of the embodiment shown in FIG. 3.
Figure 4B:
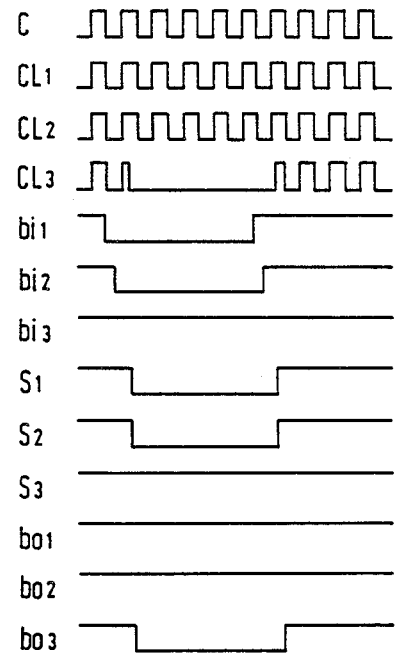

FIG. 4B shows the same series of time diagrams as shown in FIG. 4A, albeit for the situation where two stations substantially simultaneously output a signal intended for the other stations. This station, whereto the upper connection network is connected, outputs a signal $bi1=0$ which is intended for the stations whereto the other two connection networks are connected. The station whereto the second connection network is connected outputs a signal $bi2=0$ which is intended for the stations whereto the upper and the lower connection network are connected. These signals are written into the flipflops 20 and 21, respectively, in response to the positive going edge of the next clock pulse, with the result that S1,2 become 0 while S3 remains 1. As a result, $b01,2$ remain 1 and $b03$ becomes 0. When the applied signals disappear again, which means when $bi1,2$ become 1, the signal $b03$ also disappears, which means that $b03$ becomes 1 and the initial situation has been restored. Therefore, a signal is applied only to the station which is connected to the lower connection network. It again holds good that the clock pulses for the flipflop 22 are blocked for the period of time during which $b03=0$.

What is claimed is:

1. A multi-master single-channel communication bus system having a star circuit for effecting communication between each one of a plurality of stations and each other of the plurality of stations, the star circuit comprising:

a plurality of bus line connections each including an associated electrical termination impedance (35, 36, 37) and an associated wired logic functionality, each bus line having a rest state and an active state, said star circuit further comprising, for a first one of said connections:

(a) a respective buffer element (20,21,22) for storing said rest state of the bus line (bi1, bi2, bi3) connected to said first connection;
(b) a respective logic circuit (29, 30, 31);
(c) first respective interconnection means (26, 27, 28) for feeding logic circuits, associated with any connection other than said first connection, with a first signal (S1, S2, S3) representing the rest state of the bus line connected to said first connection;
(d) second respective interconnection means (32, 33, 34) for feeding the respective logic circuit of said first connection with a second signal ($\overline{Q}$) representing absence of the rest state of the bus line connected to said first connection;
(e) respective means (b01, b02, b03) in said respective logic circuit for supplying:
(i) a first control signal, under control of either:
(A) presence of the second signal pertaining to said first connection, or
(B) combined presence of first signals analogous to said first signal and pertaining to all connections other than said first connection, and
(ii) a second control signal, otherwise; and
(f) respective inhibiting means (23, 24, 25), fed by said respective supplying means, for:
(i) under control of said second control signal, inhibiting any change-of-state of said respective buffer element; and
(ii) under control of said first control signal, allowing said change-of-state, and wherein said second signal is fed to said wired logic functionality for masking said rest state by emulating said active state.

2. The system of claim 1, wherein said first and second control signals are alternate logic states of a single line.

3. The system of claim 1, wherein said wired logic functionality is a logic AND function.

4. The system of claim 1, wherein said inhibiting means is a single gate fed by an output of a clock signal generator.

5. The system of claim 4, where said buffer is a clocked data flip-flop.

6. The system of claim 1, wherein said star circuit comprises at least three said first connections.

7. The system of claim 1, wherein said logic circuit comprises:
(a) a first coincidence determinator (26) fed by said first interconnection means; and
(b) a second determinator (29) fed by said first determinator and said second interconnection means.

8. A device comprising a built-in star circuit as claimed in claim 1 and at least one station which is internally connected thereto via an associated bus connection.

9. A device as claimed in claim 8, characterized in that said star circuit comprises at least one externally accessible connection for connection of an associated external station via an external bus connection.

10. A star circuit for effecting communication between each one of a plurality of stations and each other of the plurality of stations in a multi-master, single-channel communication bus system, the star circuit comprising (a) a plurality of bus connections for coupling with respective stations via respective bus lines, each bus line having a respective rest state and a respective active state;
(b) a plurality of terminating impedances, one for each bus connection;
(c) for each respective bus connection:

(I) a respective buffer element (20,21,22) for storing said rest state of the bus line (bi1, bi2, bi3) connected to the respective connection;
(II) a respective logic circuit (29, 30, 31);
(III) first respective interconnection means (26, 27, 28) for feeding logic circuits, associated with any connection other than the respective connection, with a first signal (S1, S2, S3) representing the rest state of the bus line connected to the respective connection;
(IV) second respective interconnection means (32, 33, 34), including respective logic circuit of the respective connection with a second signal ($\overline{Q}$) representing absence of the rest state of the bus line connected to the respective connection;
(V) respective means (b01, b02, b03) in said respective logic circuit for supplying:
  (i) a first control signal, under control of either:
    (A) presence of the second signal pertaining to the respective connection, or
    (B) combined presence of first signals analogous to said first signal and pertaining to all connections other than the respective connection, and
  (ii) a second control signal, otherwise; and
(IV) respective inhibiting means (23, 24, 25), fed by said respective supplying means, for:
  (i) under control of said second control signal, inhibiting any change-of-state of said respective buffer element; and
  (ii) under control of said first control signal, allowing said change-of-state, and
wherein said second signal is fed to said respective wired logic functionality for masking said rest state by emulating said active state.

* * * * *